Dec. 14, 1965 W. F. GRAFTON 3,223,512
GLASS BENDING MOLD WITH SHEET GUIDE
Original Filed Aug. 25, 1958

INVENTOR.
WILLIAM F. GRAFTON
BY *Oscar L. Spencer*
ATTORNEY

United States Patent Office 3,223,512
Patented Dec. 14, 1965

3,223,512
GLASS BENDING MOLD WITH SHEET GUIDE
William F. Grafton, Kittanning, Pa., assignor to Pittsburgh Plate Glass Company, Pittsburgh, Pa., a corporation of Pennsylvania
Original application Aug. 25, 1958, Ser. No. 756,766, now Patent No. 3,155,482, dated Nov. 3, 1964. Divided and this application Mar. 11, 1964, Ser. No. 351,049
3 Claims. (Cl. 65—290)

This application is a division of application Serial No. 756,766, filed August 25, 1958, for "Method of Bending Glass Sheets," which issued on November 3, 1964, as U.S. Patent No. 3,155,482.

This application relates to treating glass sheets, and specifically refers to improvements in molds for bending glass sheets, in particular, to side stops for aligning glass sheets properly on bending molds.

In recent years, the glass bending industry has used sectionalized bending molds having relatively movable molding sections each of which includes an upper shaping surface conforming to a different portion of the ultimate shape of the glass sheet. These sectionalized bending molds of the prior art comprise end molding sections and a central mold portion comprising one or more additional molding sections intermediate the end molding sections. The molding sections move into a spread position for supporting a flat glass sheet preparatory to bending and into a closed position to form a substantially continuous shaping surface conforming in elevation and outline to the ultimate shape desired.

Flat glass sheets are mounted on the spread molds and their mass and rigidity maintain the molds in their spread position. The glass laden molds are transported through a tunnel-like bending lehr where the glass softens, permitting the molding sections to move into the closed mold position and provide a proper shaping surface to which the glass sheets conform.

In order to insure that flat glass sheets are loaded properly on such molds for bending and to insure that the glass remains in proper alignment as the glass sags to conform to the mold shaping surface, guiding members have been mounted upon molds to contact a side edge of the glass. These guiding members are known in the art as side stops.

In the past, side stops were mounted in fixed relation to a portion of the mold. However, the edge portions of the flat glass sheet abutting the side stops remained in continuous contact with the side stops throughout the bending cycle, thus establishing regions having undesirable stress patterns. Also, the frictional resistance to free movement of these glass edge portions relative to the side stops frequently distorted the softening glass sheet in the edge portions contacted by the side stop. This resulted in a tendency of the portions of the edge in contact with the side stops to become kinked.

According to the present invention, deleterious edge stresses have been modified and kinking substantially eliminated by moving each side stop or glass edge contacting member along a path having a vertical component of motion substantially equal to the vertical distance which the contacted edge portion of the glass sheet sags. The side stops are also each provided with a component of motion longitudinally of the contacted glass sheet edge so that they contact different portions of the glass edge during the bending cycle. This longitudinal displacement of the contacted glass edge portion along the glass sheet edge spreads the regions of the glass edge subject to a stress differential and thereby reduces the stress gradient which minimizes the effect of the stress pattern causing the possibility of glass breakage.

In a particular embodiment of the present invention, a sectionalized bending mold comprising a rigidly supported center section and pivoted end sections having weighted lever arms that pivot the end sections relative to the center sections are constructed so that side stops are secured to the weighted lever arms in such locations that the vertical component of movement of the side stops or glass edge contacting members is substantially equal to the vertical distance the edge portions of the glass sheet contacted by the side stops sag, and the side stops are also constructed to move lengthwise of the glass sheet a short distance in glass edge contact.

A particular embodiment of the present invention will be described in order to illustrate the present invention.

In the drawings which form part of the present invention,

Figure 1:
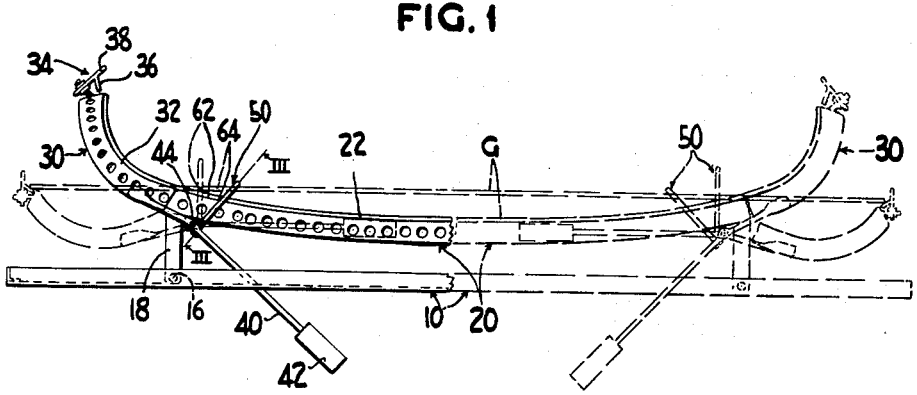
FIG. 1 is a longitudinal elevational view of a typical embodiment of sectionalized bending mold constructed in accordance with the present invention, wherein a portion of the mold is shown in its closed mold position in solid lines and the balance in phantom and also in its open position in phantom.
Figure 2:
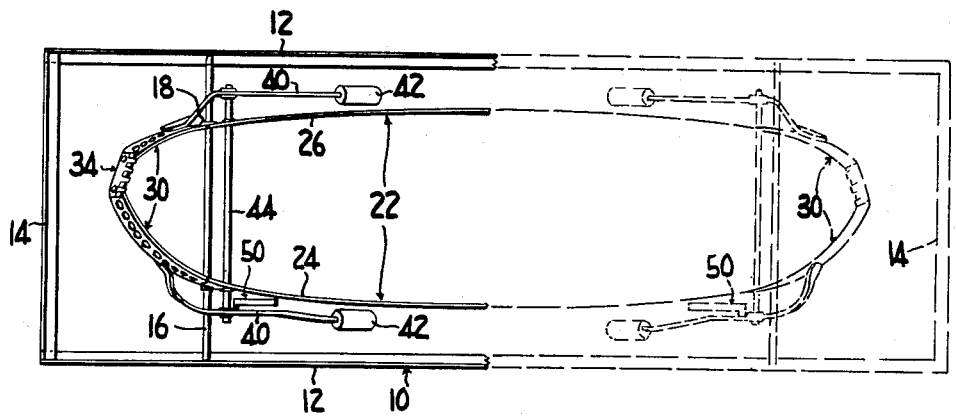
FIG. 2 is a plan view of the mold of FIG. 1, showing the mold in its closed position.
Figure 3:
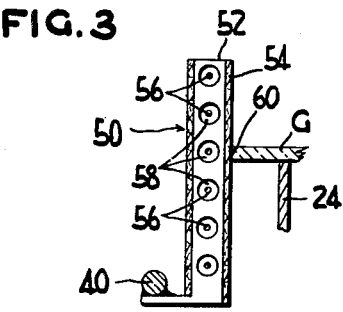
FIG. 3 is an enlarged detail view along the lines III—III of FIG. 1, showing the construction of the side stop relative to its attached lever arm.

Referring to the drawings, reference number 10 refers generally to a mold support structure which includes a pair of longitudinal rails 12 interconnected at their ends by transverse rails 14. The latter are adapted to ride on conveyor rolls which are rotated to propel the mold support structure laterally through a bending lehr (not shown). The support structure also includes bracing rods 16 interconnecting the longitudinal extending rails 12 and vertical posts 18 extending upwardly from the bracing rods.

The bending mold 20 comprises a central molding section 22 comprising spaced rails 24 and 26 which are rigidly supported to the mold support structure 10 through the vertical posts 18. Flanking the central molding section 22 at each longitudinal extremity is an end molding section 30 of arcuate or triangular configuration conforming to the outline of the longitudinal extremity of the sheet supported for bending. Each arcuate end molding section 30 comprises a curved rail 32.

At the longitudinal outboard extremity of each of the curved rails 32, a glass edge support and guide member 34 is attached. This guide member 34 includes a series of spaced tabs 36 for supporting the bottom edge of the flat glass sheet and alternating with angularly disposed spaced tabs 38 to assist loaders to align the glass sheets properly longitudinally of the mold.

Weighted arms 40 provided with weights 42 at their inboard extremities are attached to extend longitudinally inboard of the longitudinal inboard extremities of each end molding section 30. The weighted arms 40 and their attached end molding sections 30 are hinged about the ends of hinge rods 44 which extend transversely of the mold to define substantially horizontal pivot axes for the end molding sections and interconnect rails 24 and 26. Weighted arms 40 are so constructed that they swing in arcs in substantially vertical planes laterally outboard of rails 24 and 26 so that the weights 42 move in paths adjacent the center of the center section rails. Their thermal capacity causes the adjacent glass sheet portions to remain cooler than the remainder of the sheet during the bending cycle. Suitable stop members (not shown) are included in the mold construction to insure that the end molding sections do not pivot beyond the position desired for the closed mold position.

What has been described thus far is a typical skeletonized sectionalized bending mold. However, instead of securing side stops 50 in fixed relation to the center molding section of the bending mold 20 as in the past, the present invention provides that the side stops 50 be attached to the weighted arms 40 located to one side only of the glass bending mold such as the weighted arms 40 that pivot in planes normal to said substantially horizontal pivot axis immediately laterally outboard of center section rail 24. This attachment may be accomplished by welding. Locating the side stops to one side only of the bending mold facilites loading the flat glass in proper alignment and unloading the bent sheet.

Each side stop 50 comprises an apertured bar 52 disposed in edgewise relation relative to the width of the bending mold. A flexible cover 54 of a material that does not harm glass such as fiber glass, asbestos, etc., is wrapped around the apertured bar 52 and secured thereto by means of staples 56 which extend through the apertures 58 of the apertured bar 52.

The location of the side stop 50 relative to its weighted arm 40 to which it is attached is so arranged that a portion 60 of the side stop 50 which contacts the flat glass sheet G at a portion 62 of the glass edge remains in contact with a portion of the glass edge because portion 60 of the side stop 50 moves vertically a distance substantially equal to the sagging of the glass sheet. However, by virtue of the rotation of the weighted arm 40 about the pivot rod 44, the side stop moves relative to the glass longitudinal side edge along a component equal to the distance between points 62 and 64 lengthwise of the glass edge. Therefore, each side stop 50 engages different portions of the glass sheet edge during the bending cycle.

In operation, the end mold sections 30 are pivoted about the hinge rods 44 into the spaced mold position. In this position, the spaced tabs 36 support the bottom surface of the flat glass sheet at its extremities and the longitudinal extremities of the center section rails 24 and 26 provide intermediate glass sheet support. At this stage of the bending cycle, portion 60 of side stop 50 contacts the flat glass sheet at portion 62 of the glass edge. As the glass laden mold is conveyed through an annealing lehr, it is softened by a combination of heat sagging of the center portion that conforms to the central mold section 22 and a lifting of the longitudinal extremities of the glass sheet by the action of the weights 42 acting through weighted arms 40 to force the arcuate end molding sections 30 upwardly to impress their upper shaping surfaces on the shape of the softening glass sheet.

Glass edge contacting portion 60 of side stop 50 moves in a substantially vertical plane normal to the substantially horizontal axis provided by pivot rods 44 through an arc as the end molding sections 30 rotate into the closed mold position. This arcuate movement of the glass edge contacting portion 60 contains a vertical component of motion that is substantially equal to the vertical distance that the glass sheet sags from its flat to its curved configuration. This arcuate motion of the glass edge contacting portion 60 of side stop 50 also contains a horizontal component of motion that is greater than the horizontal component of motion of the portion of the glass sheet sagging from a straight line to a curve. Therefore, there is relatively little comparative vertical movement between the side stops 50 and portions 62 and 64 of the glass sheet, but some relative horizontal movement.

Since the glass is relatively free from distortion in its lengthwise dimension compared to its susceptibility to distortion in its thickness dimension, the glass sheet is not kinked by this relative movement lengthwise of the glass sheet edge during the bending cycle. Furthermore, the glass edge is less susceptible than formerly to large localized stresses in the area of contact with the side stop 50 by virtue of side stop movement longitudinally of the glass instead of the previous constant edgewise contact between the side stops and portions of the glass edge during the bending cycle.

This combination of virtually no relative movement vertically with some horizontal movement equal to the distance between portions 62 and 64 along the edge of the glass sheet combines to minimize kinking that results from relative movement in the edgewise dimension of the glass sheet and furthermore provides a minimum variation in the edge stress pattern since the side stop is not in continuous contact with the same portion of the glass sheet edge throughout the heating and cooling phases of the bending cycle.

The side stops 50 have been shown to be operatively associated with weighted arms 40 by direct attachment. It is also possible for the side stops to be operatively connected with the lever arms by cam or linkage action to provide desired control of movement for the side stops in synchronism with the bending cycle and avoid the criticality of location characteristic of the embodiment illustrated. However, the illustrated embodiment is preferred because it is economical to construct and is comparatively easy to maintain because it minimizes the number of moving parts required for the mold structure.

A preferred embodiment of the present invention has been described for purposes of illustration rather than limitation. Reference to the scope of the present invention may be obtained from the accompanying claims.

I claim:

1. Apparatus for bending elongated glass sheets comprising a horizontally disposed, sectionalized mold including two end molding sections and a center molding portion intermediate said end molding sections, a weighted arm secured to each of said end molding sections and extending longitudinally inwardly therefrom, pivot means attached to said center molding portion and extending transversely thereto for pivoting each of said end molding sections about a substantially horizontal axis between a spread mold position for receiving a flat glass sheet for bending and a closed mold position, and a glass edge contacting member located on the longitudinally inner side of said pivot means in a substantially vertical plane adjacent and laterally outboard of one side only of said center molding portion and connected to the laterally inner side of each weighted lever arm for arcuate movement therewith in said substantially vertical plane with its associated weighted arm in response to the pivoting of said attached end molding section, said glass edge contacting member being operatively responsive to rotation of its associated end molding section into the closed mold position to move downwardly in said substantially vertical plane with a component of motion in said plane extending longitudinally of a contacted glass sheet edge and a vertical component of motion in said plane substantially equal to the vertical distance the contacted glass edge portion moves vertically to conform to the mold shaping surface, said glass edge contacting members not applying a compressive force against said contacted edge.

2. Apparatus for bending glass sheets comprising a horizontally disposed, sectionalized mold including a center molding section comprising a pair of longitudinally extending, laterally spaced rails and end molding sections, each of said sections having an upper shaping surface conforming to a different portion of a mold shaping surface, pivot means attached to said center molding section and extending transversely thereof in a substantially horizontal plane for pivoting each end molding section relative to the center molding section between a spread mold position to receive a flat glass sheet for bending and a closed mold position adjacent said center molding section to provide with said center molding section a substantially continuous shaping surface conforming to the shape desired for the bent glass sheet, a weighted arm attached to each end molding section and extending longitudinally inwardly thereof, a pair of longitudinally spaced glass edge contacting members, each connected to a weighted arm longitudinally inward of said pivot means for arcuate movement therewith and located to the laterally inner side of said weighted arm laterally outboard and adjacent one of said center mold section rails only for contact by portions of only one longitudinal side edge of the flat glass sheet supported on said mold to insure proper lateral alignment of said glass sheet relative to said mold, each glass edge contacting member being operatively responsive to rotation of its associated end molding section into the closed mold position to move in a substantially vertical plane laterally outboard and adjacent said one of said center mold section rails only with a vertical component of motion substantially equal to the vertical distance the glass edge portion contacted by the glass edge contacting member moves vertically to conform to the mold shaping surface and a horizontal component of motion lengthwise of the supported glass sheet, said glass edge contacting members not applying a compressive force against said contacted edge.

3. Apparatus for bending glass sheets comprising a horizontally disposed, sectionalized mold including a plurality of molding sections each provided with an upper shaping surface conforming to a portion of the shape desired for the bent glass, said sections including a center molding section comprising a pair of longitudinally extending, laterally spaced rails, and end molding sections, pivot means attached to said center molding section and extending transversely thereof in a substantially horizontal plane for pivoting each end molding section about a substantially horizontal axis relative to the center molding section between a spread mold position to receive a flat glass sheet for bending and a closed mold position adjacent to said center molding section to provide with said center molding section a substantially continuous shaping surface conforming to the shape desired for the bent glass sheet, a pair of weighted arms attached to each end molding section and extending longitudinally inwardly of said pivot means with a laterally inwardly facing side thereof adjacent and laterally outboard of said rails, a side stop attached longitudinally inwardly of said pivot means to only one weighted arm attached to each end molding section for arcuate movement therewith and located on the laterally inward side of said weighted arm, the latter weighted arms located adjacent only one of said center mold section rails, each side stop being secured to one of said latter weighted arms in such a position that it moves therewith in an arcuate path in a substantially vertical plane adjacent said one of said center mold section rails and has a vertical component of motion substantially equal to the vertical distance the contacted glass edge portion sags to conform to the mold shaping surface and a horizontal component of motion lengthwise of the contacted glass sheet edge as said sectionalized bending mold moves from the spread mold position to the closed mold position, said side stops not applying a compressive force against said contacted edge portion.

References Cited by the Examiner
UNITED STATES PATENTS
2,872,756  2/1959  Jendrisak _____ 65—290

DONALL H. SYLVESTER, *Primary Examiner.*